United States Patent Office 2,951,258
Patented Sept. 6, 1960

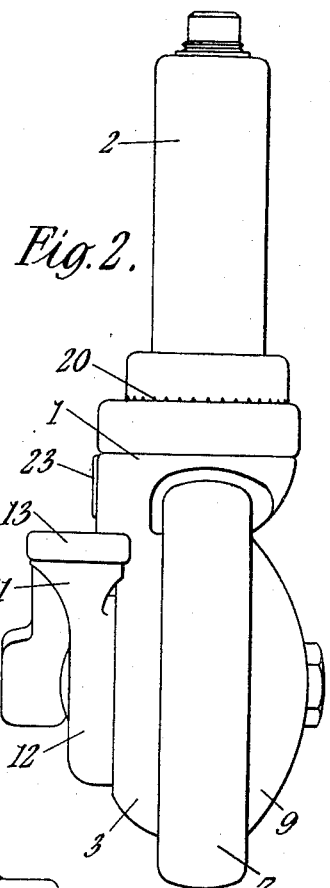
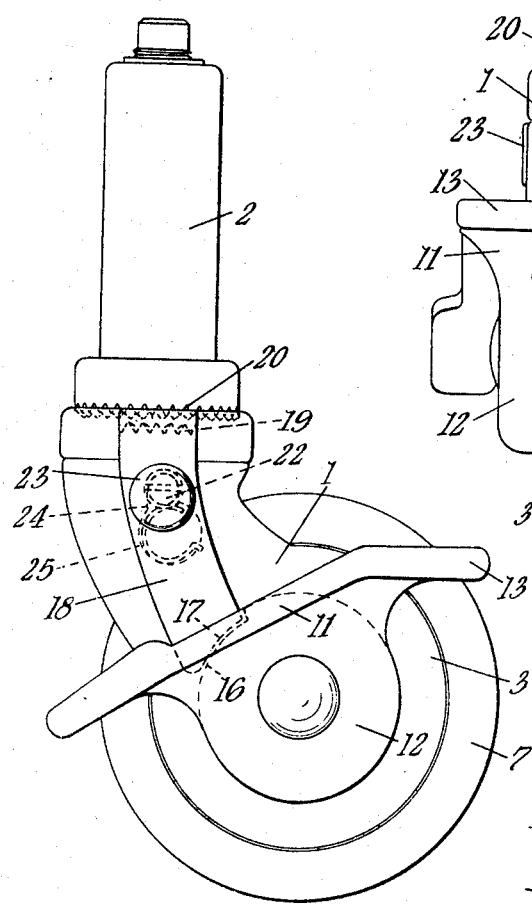
Fig. 2.
Fig. 1.
Inventors
H.E.H. Brooks
K.C. Godard

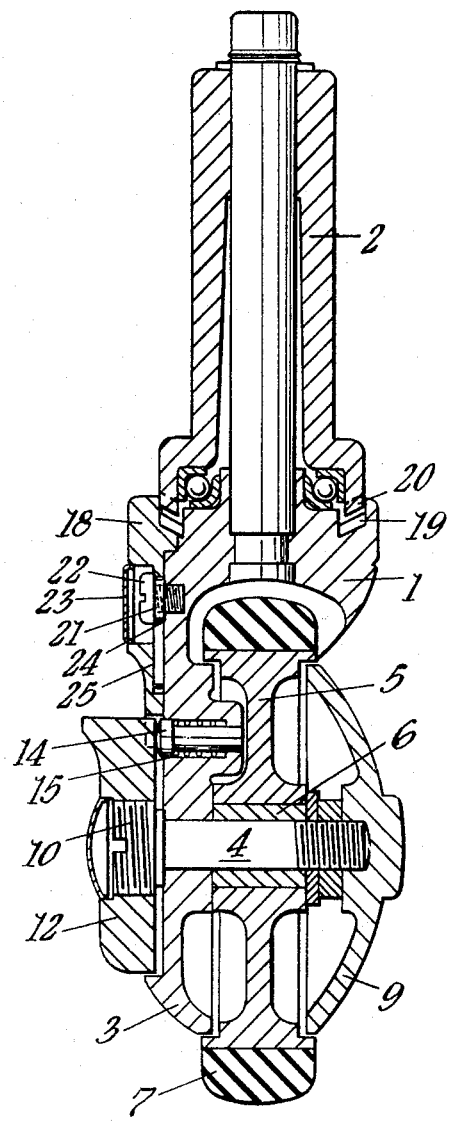

2,951,258

CASTORS

Harold Edgar Henry Brooks, Birmingham, and Kenneth C. Godard, South Croydon, England, assignors to British Castors Limited, Tipton, and C. W. Godard & Co. Limited, South Croydon, England Filed May 5, 1959, Ser. No. 811,160

Claims priority, application Great Britain May 7, 1958

2 Claims. (Cl. 16—35)

This invention relates to castors and in particular to castors incorporating brakes and the object of the invention is to provide castors with brakes which are easy to operate and which are efficient in immobilizing the article to which they are fitted.

The invention consists in a castor having a brake adapted to prevent the swivelling action and a brake adapated to prevent the rotation of the wheel.

The invention further consists in a castor as set forth in the preceding paragraph provided with a foot operated lever with which both brakes are engaged or disengaged simultaneously.

The accompanying drawings show by way of example only, one embodiment of the invention in which:

Figure 1 is a side elevation of the castor,

Figure 2 is a front elevation of the castor, and

Figure 3 is a vertical section of the castor.

The castor is provided with one leg 1 which is adapted in known manner to rotate about the vertical spindle 2 attachable to the article on which it is used, and is provided with a shaped disc-like thread-guard 3 moulded in one with the leg and having therein the axle 4 for the wheel 5 which runs on the bushing 6.

The wheel 5 is preferably provided with a resilient tire 7 made of rubber, or other suitable material. The wheel is held upon the axle 4 by a further disc-like thread-guard 9 which is screw threaded to engage the thread on the axle and secured firmly against the bushing 6.

The axle 4 carries a threaded head portion 10 which is fitted to the foot brake member 11 by means of the disc 12. When the upper end 13 of the foot brake member 11 is depresed, the disc 12 rotates on the head portion 10 and approaches the leg 1.

The leg 1 is provided with a bore which houses a brake pin 14 which is normally held away from the wheel 5 by the spring 15, but when the brake member is operated the pin is urged towards the wheel against the action of the spring 15 thereby braking the wheel and preventing rotation. When the brake member is returned to the position shown in the drawings, the pin 14 is released and the wheel freed.

There is also provided upon the brake member 11 a cam-like surface 16 which engages a similar cam-like surface 17 on the lower end of the brake cam follower 18, the other end of which is provided with serrations 19 which are engageable with teeth 20 on the bottom of the spindle 2.

The cam follower 18 operates in a groove in the leg 1 and is held in position against leg 1 by the slotted round head pin 21, and a circular recess is provided to accommodate the head 22 covered by dust cap 23. A circular spring 25 is fitted between the pin housing 24 and the spring recess 25 in cam follower 18 ensuring the return of cam follower 18 after foot brake 11 has been released.

When the upper end 13 of the foot brake member 11 is depressed, the cam follower 18 is depressed, cam follower 18 is raised until the serrations 19 engage the teeth 20, in whatever direction the wheel is facing, and locks the castor action of the wheel.

The two brakes, the first preventing the rotation of the wheel and the second preventing castor action, effectively immobilize the article to which the castor is attached.

The brakes described and illustrated may be fitted to or incorporated in a number of different designs of castor and other details for carrying the invention into effect may be varied without departing from the scope of the invention.

What is claimed is:

1. Castor comprising a hollow spindle by means of which the castor is adapted to be attached to the article on which it is used, a leg, a vertical axle upon the leg positioned within the hollow spindle and having bearing means for rotation of the leg about a vertical axis to provide castor action, a horizontal bore in the leg, a screw threaded bolt rotatable in the said bore, a screw threaded nut upon the bolt for locking the latter in any circumferential position in the bore, a screw threaded head on the bolt, a disc-like wheel rotatable upon said bolt, a disc-like cam member having a screw threaded bore engaging upon the head of the bolt, a bore in the leg parallel to the said bolt, a headed plunger in the latter bore, a helical spring around the plunger which urges it in the direction of the disc-like cam to contact the side of the latter, the plunger being moved towards and to contact a flat surface upon the wheel to brake the latter by friction by rotation of the disc-like cam member upon the head of the bolt, a toothed wheel upon the spindle, a cam-like surface upon the edge of the disc-like cam member, a groove in the side of the leg, a cam follower in the groove having at one end thereof a plurality of teeth engageable with the teeth upon the toothed wheel and at the other end a shaped surface engaging the cam-like surface upon the disc-like cam member, a spring urging the cam follower in the direction of the disc-like cam member, the teeth upon the cam follower engaging the toothed wheel to prevent castor action when the disc-like cam is rotated upon the head of the bolt to brake the wheel, and a lever-like brake operating member upon the disc-like cam member which, by the pressure downwards thereon at opposite ends thereof, causes the disc-like cam to be rotated in opposite directions to engage and disengage the brakes respectively.

2. Castor as claimed in claim 1 in which the disc-like member is shaped to form a thread guard on one side of the wheel while a disc-like thread guard is provided upon the bolt at the other side of the wheel.

References Cited in the file of this patent

UNITED STATES PATENTS

| | | |
|---|---|---|
| 1,633,638 | Jarvis et al. | June 28, 1927 |
| 1,671,774 | McIntosh | May 29, 1928 |
| 2,068,160 | Zeindler | Jan. 19, 1937 |

FOREIGN PATENTS

| | | |
|---|---|---|
| 530,352 | Italy | July 8, 1955 |